United States Patent [19]

Jones et al.

[11] Patent Number: 4,643,268

[45] Date of Patent: Feb. 17, 1987

[54] AIR LIFTED AND PROPELLED VEHICLE

[75] Inventors: Thomas E. Jones; Raynor A. Johnson, both of Newark, Del.

[73] Assignee: American Antigravity Co., Inc., Great Neck, N.Y.

[21] Appl. No.: 640,319

[22] Filed: Aug. 13, 1984

Related U.S. Application Data

[63] Continuation of Ser. No. 479,082, Mar. 25, 1983, abandoned, which is a continuation-in-part of Ser. No. 365,520, Apr. 5, 1982, abandoned.

[51] Int. Cl.⁴ .............................................. B60V 1/14
[52] U.S. Cl. .................................... 180/116; 104/23.2; 114/67 A; 180/125; 244/12.1; 244/23 R; 414/676
[58] Field of Search ............... 180/116, 117, 118, 119, 180/120, 121, 122, 123, 124, 125, 126, 127, 128, 129, 130; 414/676; 114/67 A; 244/12.1, 23; 104/23 FS

[56] References Cited

U.S. PATENT DOCUMENTS

| | | | |
|---|---|---|---|
| 3,088,536 | 5/1963 | Chezem | 180/116 X |
| 3,096,728 | 7/1963 | Amann et al. | 104/23 FS X |
| 3,261,177 | 7/1966 | Amann et al. | 62/297 |
| 3,262,510 | 7/1966 | Froehler | 180/122 |
| 3,275,270 | 9/1966 | Earl et al. | 180/122 X |
| 3,276,222 | 10/1966 | Hutchinson | 62/239 |
| 3,321,038 | 5/1967 | Mackie et al. | 180/124 |
| 3,401,766 | 9/1968 | Laufman et al. | 180/119 |
| 3,416,626 | 12/1968 | Nagamatsu | 180/124 |
| 3,429,395 | 2/1969 | Beardsley | 180/117 |
| 3,467,213 | 9/1969 | Walker | 180/120 |
| 3,563,333 | 2/1971 | Bearsley | 180/118 |
| 3,587,771 | 6/1971 | Faure | 180/120 |
| 3,608,662 | 9/1971 | Ferguson | 180/117 |
| 3,687,217 | 8/1972 | Mueller | 180/120 |
| 3,739,407 | 6/1973 | Stiller | 5/81 B |
| 3,777,842 | 12/1973 | Laufman | 180/117 |
| 3,827,527 | 8/1974 | Bertelsen | 180/120 |
| 3,844,509 | 10/1974 | Jenkins | 244/100 A |
| 3,869,020 | 3/1975 | Holland | 180/120 |
| 3,948,344 | 4/1976 | Johnson | 180/124 |
| 4,111,277 | 9/1978 | Peisell | 180/122 |
| 4,155,421 | 5/1979 | Johnson et al. | 180/125 |
| 4,298,083 | 11/1981 | Johnson et al. | 180/125 |
| 4,417,639 | 11/1983 | Wegener | 180/125 |

FOREIGN PATENT DOCUMENTS

| | | |
|---|---|---|
| 2362031 | 12/1973 | Fed. Rep. of Germany . |
| 2427480 | 5/1978 | France . |
| 1306687 | 4/1970 | United Kingdom . |

Primary Examiner—Joseph F. Peters, Jr.
Assistant Examiner—Mitchell J. Hill
Attorney, Agent, or Firm—Ostrolenk, Faber, Gerb & Soffen

[57] ABSTRACT

The disclosure concerns a vehicle which is both lifted and propelled by air flow. The vehicle comprises an upper deck, a depending peripheral side wall and a flexible, perforated sheet secured beneath the bottom of the side wall, thereby defining an open plenum. A propeller in an air flow directing cowl seats atop the deck and part of the air flow is directed into the plenum and the remainder of the air flow is directed to move the vehicle. The underside of the upper deck disperses air in the plenum. Alternatively, the propeller is part of a duct which directs air into and disperses it around the plenum. The cowl includes an air dam for trapping reverse flowing air. A rudder directs the motion of the vehicle. The plenum narrows in width toward the front and diminishes in height away from the plenum inlet through the upper deck. In an alternate embodiment, the cowl has louvered exits along both lateral sides, and selective opening and closing of these louvered exits turns the vehicle, brakes it or even causes it to move in reverse. The main exit from the cowl is then provided with a shutter which is movable to control the speed of the vehicle and which when closed cooperates with the louvers for moving the vehicle rearwardly. In another alternate embodiment, the vehicle has a plurality of separate ones of the plenums beneath its deck. Finally, a train of the vehicles may be made, with a single airflow supplying air to all the plenums.

42 Claims, 17 Drawing Figures

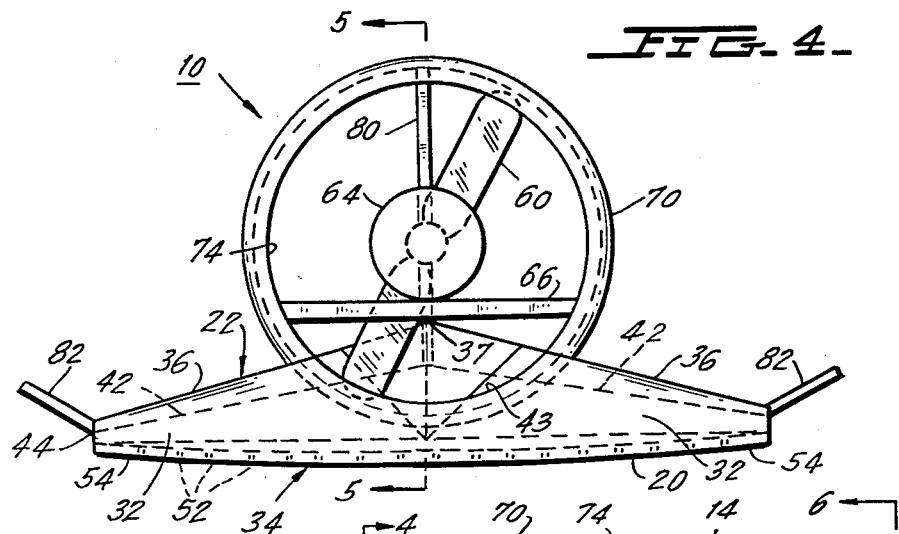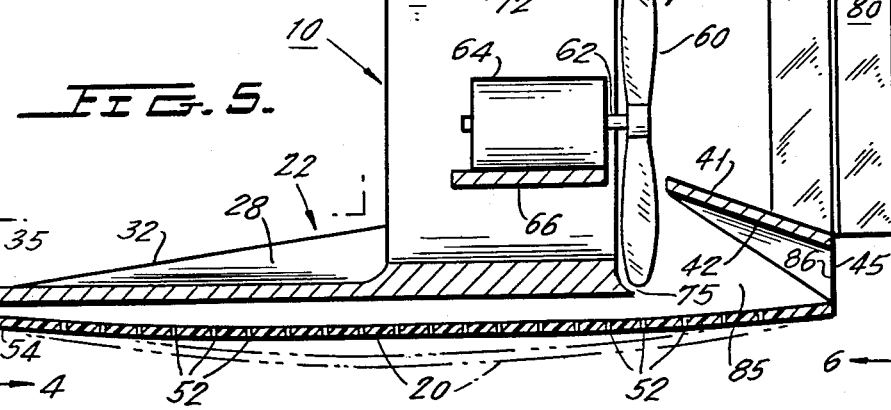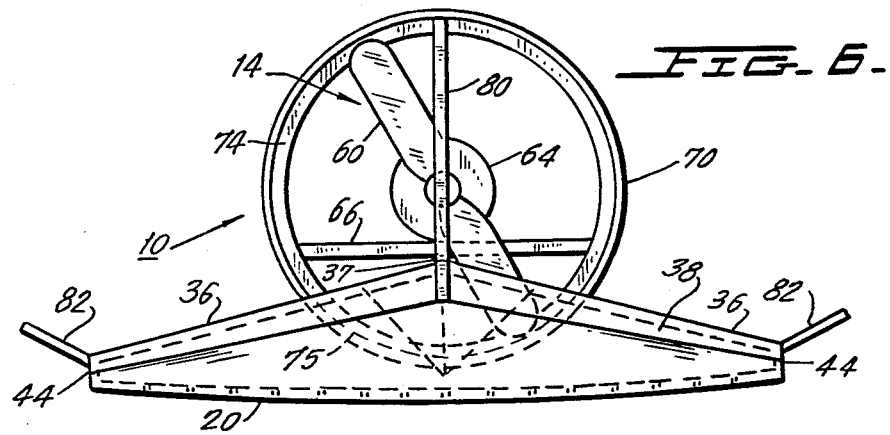

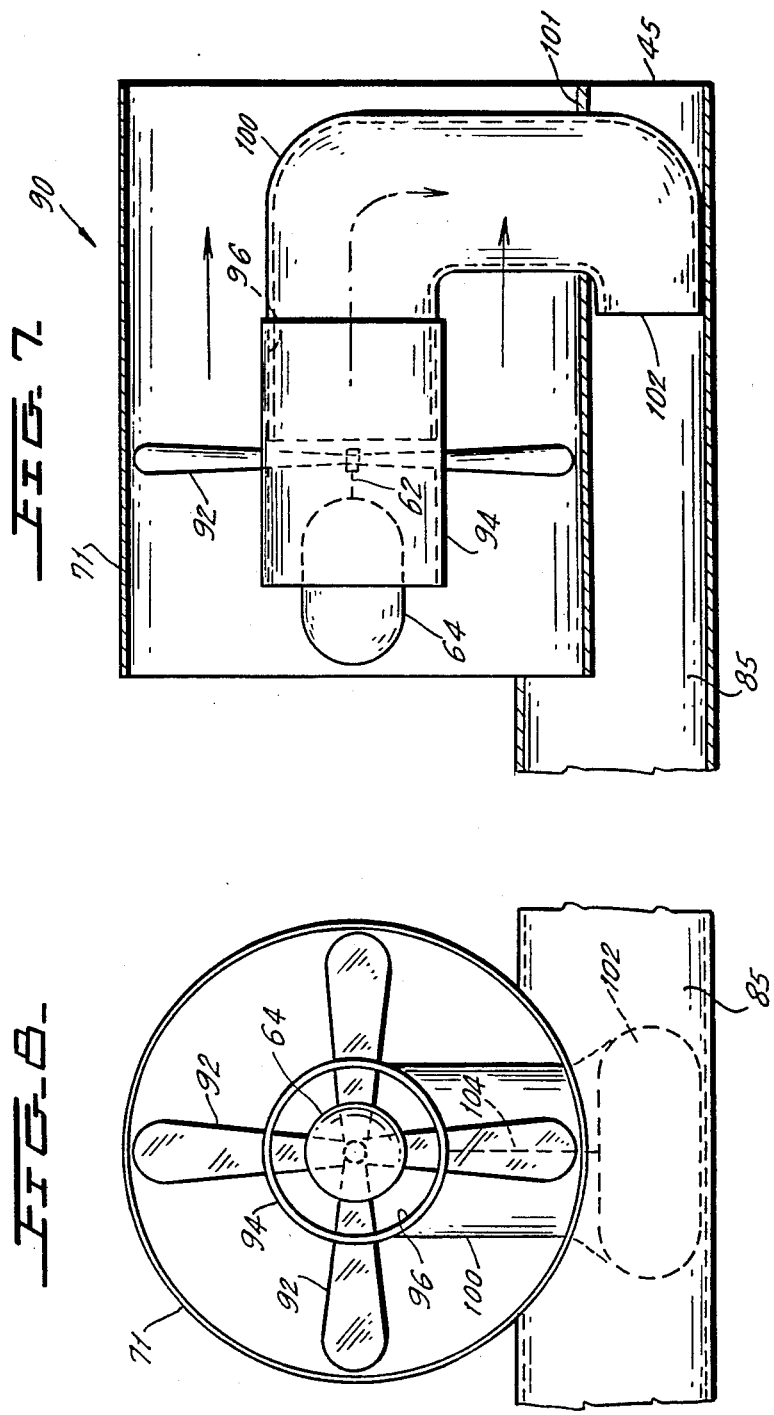

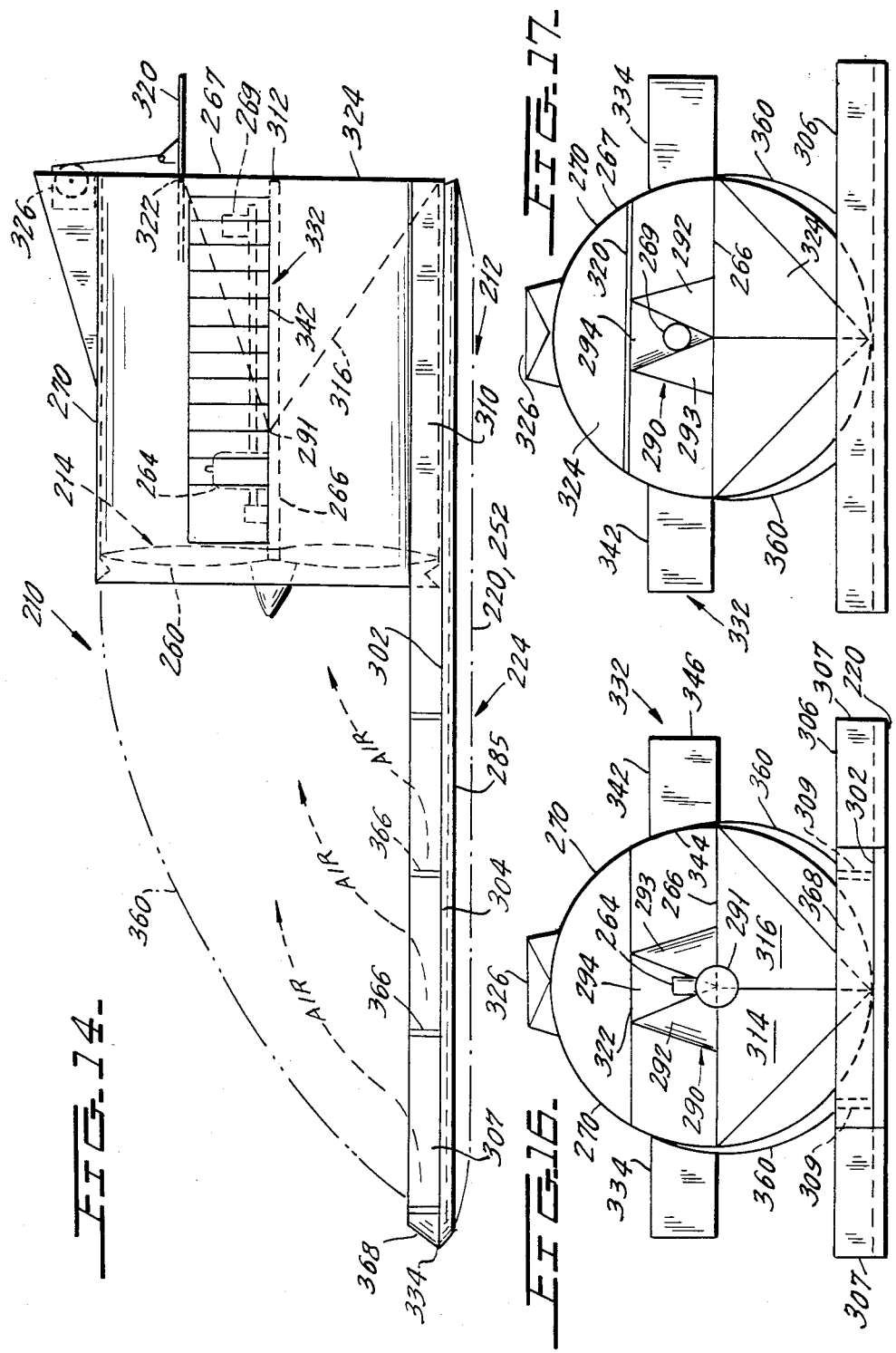

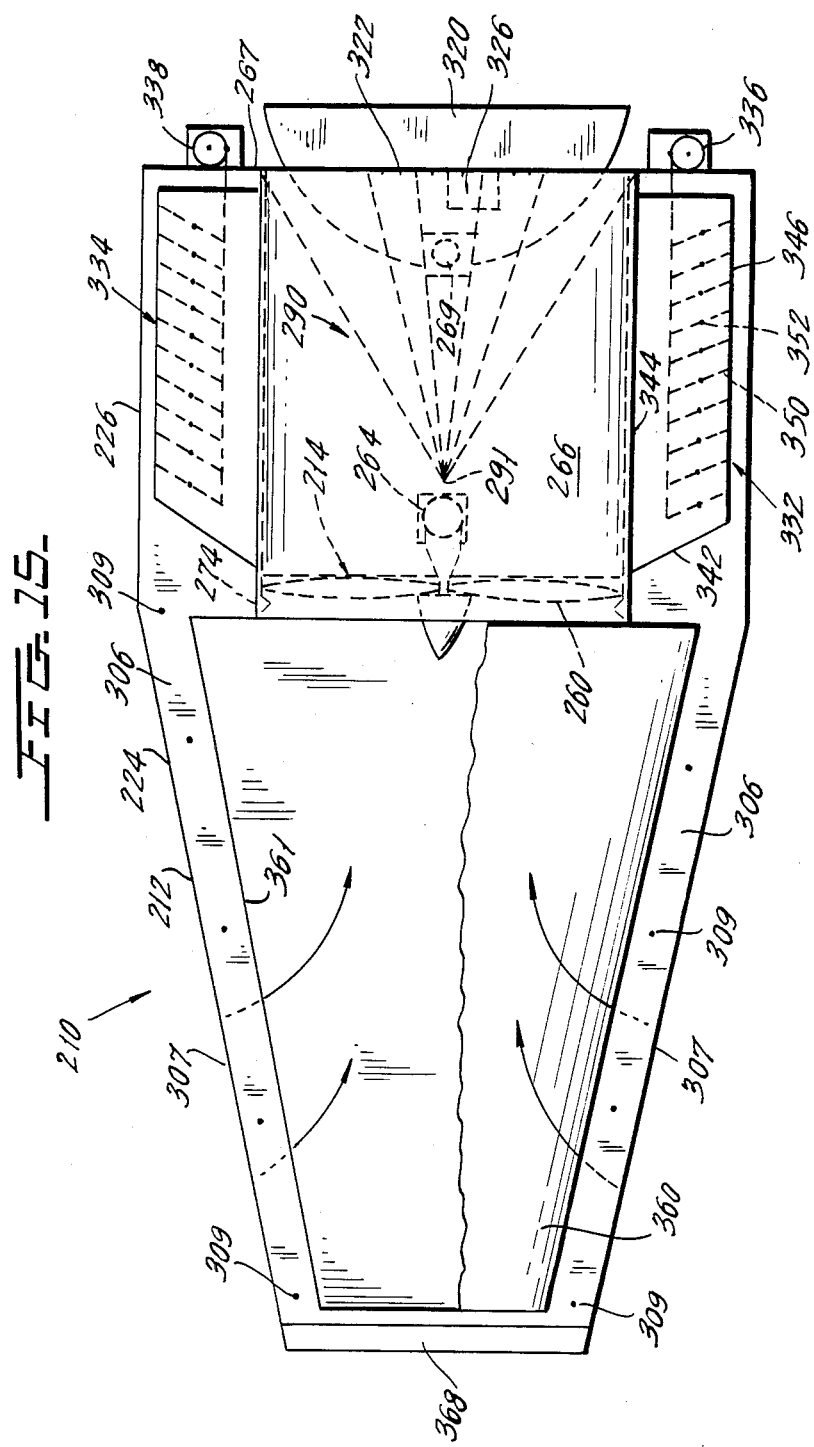

AIR LIFTED AND PROPELLED VEHICLE

CROSS REFERENCE TO RELATED APPLICATION

This is a continuation of application Ser. No. 479,082, filed Mar. 25, 1983, now abandoned, which is a continuation-in-part of Ser. No. 365,520, filed Apr. 5, 1982, now abandoned.

BACKGROUND OF THE INVENTION

1. Field of the Invention

The present invention relates to a vehicle that can be raised on a cushion of air and be propelled by air, and which incorporates improved air delivery means for performing the lifting and propulsion functions. It is a quite different type of air cushion vehicle.

2. Description of the Prior Art

The present invention is a development from U.S. Pat. Nos. 3,948,344; 4,155,421; and 4,298,083 which are all directed toward flexible film air pallets for transporting relatively heavy loads across surfaces with minimal frictional resistance. The pallet of U.S. Pat. No. 3,948,344 is representative of the pallets in this group of prior patents. The air pallet compresses a single flexible film sheet which is fixed about its edges directly beneath a load or load bearing surface and a plenum chamber is developed between the sheet and the load bearing surface upon pumping in of air. The sheet is perforated within an area lying beneath the load. Air enters an inlet into the plenum. Air dispersion means disperse the incoming air in the plenum beneath the load, and the air discharges from the plenum through the perforations in the flexible sheet for defining an air cushion that raises the vehicle.

Initially, the plenum is collapsed. In order to initially form the plenum, air is pumped in to jack or raise the load off the supporting surface upon which it is resting, slightly pillowing but not completely ballooning the flexible sheet of the air pallet. Herein, pillowing of the flexible sheet occurs upon expansion of the plenum chamber sufficiently to jack up the load and to provide the optimum size "footprint" for the flexible sheet, that is the area of the flexible sheet still immediately above the support surface. The footprint should be sufficiently large to avoid tipping of the load, yet optimally small to reduce frictional resistance to movement of the pallet across the support surface. When the flexible sheet is ballooned, in contrast, the plenum has become too large, the flexible sheet becomes too rounded, and the footprint becomes too small so that the load may become unstable and tip. Furthermore, with a ballooned flexible sheet, too many perforations are raised off the support surface, and they blow air sideways, rather than down at the support surface, wasting air and increasing the cubic feet per minute (c.f.m.) of air required to raise the pallet.

A portion of the flexible sheet at the edges of the load is preferably not perforated so that during initial inflation of the plenum with the load pressing from above, all of the initial inflation increases the pressure in the plenum, jacks up the load and pillows the flexible sheet without air escaping through exposed perforations in the pillowed sheet. Once the load is raised far enough and the pressure in the plenum increases enough, the air escapes through the perforations and forms an air cushion beneath the pallet and then escapes to the sides of the pallet.

Other object support systems use a flexible perforated sheet or diaphragm disposed beneath a rigid surface with an air pressurizable plenum defined between the diaphragm and the rigid surface. See U.S. Pat. Nos. 3,416,626; 3,844,509; and 3,739,407. Air escaping through the holes in the flexible sheet supports the system. The present invention, however, is not merely concerned with support, but is also concerned with propulsion and with controlling the movement of the air lifted vehicle, including in some embodiments controlled forward and rearward motion, braking and turning.

Other examples of a flexible diaphragm disposed beneath a platform to support a pallet or the like are shown in U.S. Pat. Nos. 3,261,177; 3,276,222; 3,321,038; and 3,844,509. These show an annular plenum defined beneath a rigid platform by a flexible sheet or diaphragm. Air is delivered to the center of the annulus and beneath the flexible diaphragm and the air moves out from the center of the annulus and passes beneath the annular diaphragm. Even when the exit of air to the center of the annulus is through the flexible diaphragm, the air is delivered to the central area surrounded by the annulus, as shown in U.S. Pat. No. 3,276,222, and as is also discussed in above-mentioned U.S. Pat. No. 3,844,509.

Also well known are air cushion vehicles. Such a vehicle typically comprises an upper deck, a peripheral wall or skirt depending from the deck, defining an open bottom space below the deck, and air pressure generating means, such as a propeller, which pressurizes the space beneath the deck and within the confines of the skirt, eventually building sufficient pressure to raise the skirt of the vehicle off a supporting surface such as the ground for enabling the trapped, pressurized air to escape. Often, the bottom edge of the skirt is flexible to both confine the pressurized air and to deform in passing over short-depth voids and short-height obstructions. In a number of these vehicles, the same means which pressurizes the space beneath the deck also blows air off to the side of the vehicle for propelling it. With a single means for generating air pressure, such as a propeller, the air flow may be divided, with part being used to raise the air cushion vehicle and part being used to propel it. Examples of such air cushion vehicles are shown in U.S. Pat. Nos. 3,563,333; 3,429,395; 3,608,662; 3,777,842; 3,869,020; 3,262,510; 3,401,766; and 3,587,771. It is of interest to note that none of these air cushion vehicles has the underside of the space beneath its deck, i.e. its plenum, enclosed by a sheet or otherwise encumbers exiting air flow out from beneath the vehicle. Even the vehicle of U.S. Pat. No. 3,827,527, which has a dispersal membrane, nonetheless uses the unencumbered air cushion beneath the peripheral skirt of the vehicle to provide lift, as in other patents.

An air cushion vehicle with an open bottom requires high c.f.m., and relatively low pressure for raising loads and then for propelling them. It would be desirable to reduce the need for c.f.m. while keeping the required air pressure level low, and the invention permits this, as discussed below. As a result, with the invention, more of the air supplied by an air blower is available for propelling the vehicle and less is needed to lift it.

Known air cushion vehicles experience difficulties in traveling over surface obstacles or voids, such as dips, trenches, and the like. Air cushion vehicles can serve as boats moving over water, since there are no voids and no tall obstacles to movement, and any obstacles which the craft may run into, such as waves, are not rigid, whereby the air cushion vehicle moves over what the vehicle would view as a generally flat surface. An air cushion vehicle can travel over a solid support surface, such as land, only if the surface does not have too deep voids or too tall obstacles and does not too rapidly change its contour. The vehicle cannot be raised or tilted considerably or pass over too wide a void, like a culvert or trench, because too much of the air will escape from beneath the peripheral skirt at the open bottom of the vehicle and the vehicle will simply settle to the ground. Increasing the air pressure and c.f.m. beneath the air cushion vehicle would not completely resolve the problem, because when the vehicle is raised too much, there is too large an opening for escape of the air built up beneath the peripheral skirt. The prior art, therefore, has not yet provided an efficient air cushion vehicle for traveling over land or a rough surface. The same observation would apply to the supports or vehicles having an annular plenum, where the support is obtained through air escaping beneath the annular flexible diaphragm.

As any vehicle with an open space or area confined by its periphery, or by a skirt or by an annulus moves at more than minimal speed, the air just above the surface over which it is moving will move up into the open area surrounded by a skirt or an annulus, and this will generate drag. While it is unlikely that there will be sufficient air resistance to significantly resist forward motion of the vehicle, nonetheless there will be some air turbulence beneath the vehicle caused by the air passing beneath it, which may interfere with the progress of the vehicle. In contrast, a smooth bottom provided by a flatter, pillowed sheet or diaphragm beneath the vehicle will smooth out the rough air flow and reduce turbulence and reduce the adverse effects on the progress of the vehicle which would be caused by turbulence.

In transportation of freight or persons, it has often been found that a train of vehicles is the most cost efficient transport apparatus. Conventional air cushion vehicles require so much c.f.m. that the means which generates an air flow typically only generates enough air pressure and c.f.m. to raise and propel a single vehicle. Were a train of air cushion vehicles to be provided, each would require its own air pressure generating means. More efficient use of the c.f.m., even to the extent of having a single source of air pressure supply a number of vehicles in a train of the vehicles, would be more efficient.

SUMMARY OF THE INVENTION

The invention provides a vehicle, capable of supporting a load if desired, which uses air flow both for raising the vehicle and for propeling it, which requires considerably less air pressure and c.f.m. of air for raising the vehicle than is required in conventional air cushion vehicles, which is more capable of moving over a rough surface, over voids and over surface obstacles than a comparable air cushion vehicle or vehicle with an annular plenum and which efficiently uses self-contained propulsion energy so that the vehicle itself, including its propulsion system, may be lighter in weight than conventional air cushon vehicles which must generate more c.f.m. for raising and propelling the vehicle.

The invention permits adequate c.f.m. to be produced at a lower pressure in the plenum. A conventional air cushion vehicle with an open bottom to its air chamber requires both high c.f.m. and high pressure to be lifted. With the invention, it is possible to reduce both c.f.m. and the pressure in the plenum, yet still provide the desired lift and propulsion. A support or pallet with a flexible membrane or diaphragm disposed beneath a rigid backing and having an air-filled plenum between them, will permit reduction of both c.f.m. and pressure in the plenum, but such a pallet or support is not designed for propulsion.

Broadly stated, in a first preferred embodiment, the vehicle according to the invention comprises an upper deck means which defines the top of the plenum in the vehicle and a flexible perforated film sheet or membrane extending beneath the upper deck means. The upper deck means is shaped and rigid enough as to define a permanently open plenum enclosed by the deck means and the flexible film sheet. The flexible sheet preferably extends across the underside of the entire deck means. So long as there is sufficient air flow through the perforations, there may even be a plurality of flexible sheets for a single upper deck means. Each flexible sheet then extends beneath only part of the upper deck means, creating a group of plenums beneath the upper deck means. The plenums may be pressurized by a common pressure generating means or respective pressure generating means, as appropriate.

The flexible sheet or membrane is a thin, flexible sheet of plastic material, or the like. It has a large plurality of small cross-sectioned, unrestricted openings through it, dispersed over nearly its entire surface. The sizes of the openings are such that the plenum between the deck means and the flexible sheet can be pressurized with a reasonably small amount of air pressure and c.f.m. The air exits through each of the many holes in the sheet at sufficient localized pressure that all of the resulting jets of air through the sheet together are sufficient to raise the sheet and thus the entire vehicle from the surface on a film of air, that it may be propelled while it is being supported on a film of air. If the holes were too large, air would escape too rapidly and too much pressure would be required to lift the vehicle. If the holes were not sufficiently well dispersed over the sheet, the vehicle might not be lifted uniformly, and the sheet might tilt and one side might drag. The holes are not placed all the way out to the edge of the deck means to which the sheet is attached, since when the sheet pillows, the peripheral region of the sheet will rise with the deck means, deflect away from the surface on which the vehicle is sitting and air exiting through holes in that peripheral region will be wasted. The ratio among the surface area of the flexible sheet, the number of perforations and the sizes of the perforations are all selected for effective lift of the vehicle with the most economical use of air under pressure. Furthermore, it is desirable that the unrestricted openings through the sheet be supplied from a plenum without any internal restrictions, so that the air might flow throughout the plenum and through the unrestricted openings.

The significant characteristic of the deck means is that it should be shaped so that the unpressurized plenum is not fully closed, but is at least partially open. Pressurized air introduced into the at least partially open plenum will jack up the upper deck means, enlarge the plenum to its full size and pillow the sheet and thereafter deliver air through the perforations to raise the vehicle off its supporting surface.

A vehicle according to one version of the first embodiment of the invention includes deck means comprising a rigid upper deck which has a depending, rigid, peripheral side wall or skirt. A flexible perforated film sheet or membrane is secured beneath the peripheral wall, whereby a permanently open plenum is defined by and enclosed by the deck, the side wall and the flexible film sheet. The primary purpose of the side wall is to make the plenum be initially open. In a simple modification of the foregoing, the upper deck itself would be taller in from its edges and be shorter at its edges, and it may even have a triangular cross-section, thereby eliminating a peripheral side wall altogether. But this still satisfies the invention in that the shape of the upper deck defines a permanently open plenum in cooperation with the flexible film sheet. Other shapes for the upper deck means may be envisioned by one skilled in the art for accomplishing the purpose described above.

Supported on the deck means, i.e. on the deck of the vehicle, is its propulsion means, which moves air. It is preferably a propeller. Part of the air flow is directed through a plenum inlet in the deck and part of the flow is directed off a side of the vehicle to propel the vehicle. The plenum is pressurized as the air flows in and the air is dispersed through the plenum. The pressurizing air initially pillows the film sheet, jacking up the vehicle. When the plenum is filled and will not expand further, when the air escaping through the perforations lifts the vehicle from the surface upon which it is resting, while the propulsion air flow moves the vehicle across the surface.

Before air flow into the plenum jacks the vehicle, the bottom edge of the deck means, here the peripheral wall, rests, through the flexible film sheet, on the ground or support surface, and the vehicle has a "footprint" of the shape defined by the bottom edge of its side wall. As the air flow into the plenum increases the pressure, the flexible sheet distends and pillows, the vehicle is jacked up and the footprint of the vehicle is now defined by the part of the sheet adjacent the supporting surface. The footprint becomes of smaller dimension as the vehicle is jacked up, but the height of the underside of the flexible sheet over the supporting surface will remain constant as the dimensions of the footprint of the vehicle vary.

The size of the footprint of the vehicle depends upon the pressure in the plenum. The greater the pressure in the plenum, the greater the jacking of the vehicle that is possible, and correspondingly the smaller is the footprint of the vehicle. The vehicle should not be jacked so much that its footprint becomes too small. In that case, the vehicle would tip. For jacking of the vehicle higher, to a practical height, the sheet is enlarged. But, for any given pressure, the size of the footprint will remain the same.

Although the flexible sheet in this embodiment is presently contemplated to be attached to the peripheral side wall of the vehicle in the vicinity of the bottom of the side wall, the sheet may instead wrap around the bottom of the side wall and extend up the side wall and be fastened further from the bottom of the side wall, increasing the size of the sheet for a given size vehicle and enabling the sheet to pillow more.

The entrance for air into the plenum through the deck is located toward a side of the vehicle, and particularly toward the rear end with respect to the direction in which the vehicle moves. Dispersion of air throughout the plenum is important. One problem of previous air pallets was that the plenum was initially collapsed, which would normally prevent full air dispersion. Special efforts were made to assure full air dispersion for jacking and for uniform lift of the entire pallet. In the prior patents for air pallets, already developed air pressure was delivered inside the plenum. It was thus not necessary to initially provide an enlarged plenum, as the air pressure enlarged the plenum. With the vehicle of the invention, in contrast, the pressure is first created in the plenum itself by the flow of air generated by the propulsion means, so that a preformed plenum is needed in order to trap the flowing air and create a pressurized plenum. Thus, in the present vehicle, the plenum is permanently opened, due to the shape and height of the deck means, whereby this problem with prior air pallets is not present here.

In the one version of the first embodiment of the invention, the interior wall of the plenum, where the air from the propulsion means first enters the plenum, is profiled to improve air dispersion and even to help provide lift. In particular, if the air flow into the plenum were directed straight to a vertical rear wall of the plenum, air dispersion would not be aided. Instead, to the rear of the inlet for air into the plenum, the underside of the deck slants downwardly from the center of the vehicle, both down to the rear and down to the lateral sides of the vehicle, terminating at a shorter vertical height rear wall. This shaping of the undersurface of the deck within the plenum helps disperse and distribute the air through the plenum and the air blowing over the undersurface of the deck may also help raise the rear end of the vehicle. The slant of the underside of the deck reduces back pressure as it sends air around the plenum. This gives higher c.f.m. and redirects the air for full dispersion.

In another version of the first embodiment, a conduit transmits air into the plenum and blows the air in a direction to flow throughout the plenum, avoiding any need for the interior of the plenum to be shaped to aid dispersal.

In all the versions of the first embodiment, the deck means of the vehicle, i.e. the deck and the side wall, are shaped so that the vehicle has a narrowed width front end, as compared with its rear end rearwardly past the air flow inlet to the plenum. In this preferred embodiment, the vehicle is almost generally trapezoidally shaped, being narrower toward the front and wider toward the rear. Rearward of the air flow inlet into the plenum, the vehicle has its sides extending straight back, whereby that rear portion is rectangular. Narrowing the vehicle body forward of the air inlet keeps the pressure up at the forward end of the plenum, as the air escaping through all of the perforations could otherwise reduce the pressure in the plenum and the c.f.m. out of the perforations toward the front of the vehicle. The narrowing of width also combines with the deck of the vehicle slanting downwardly toward the front of the vehicle for keeping up the pressure and the c.f.m. through the whole plenum.

Because the vehicle widens from the front toward the air inlet to the plenum, the footprint of the vehicle correspondingly widens. With the vehicle shaped as described just above and with the flexible sheet attached around the peripheral side wall, the footprint is generally "egg" shaped, with the more narrowed, pointier end of the egg forward. It is also believed that the greater width of the footprint toward the rear of the vehicle helps to keep the vehicle aimed narrow end forward, since the wider rear of the vehicle would have more drag than the narrower front. This eliminates lateral skidding of the vehicle, which is a problem with any vehicle that planes, and helps direct the vehicle in the direction in which its front is pointing after the vehicle has been turned. Furthermore, the air pressure generating and propulsion means is located toward the rear of the vehicle, whereby the vehicle is heavier at the rear. The greater width of the vehicle toward the rear results in more perforations being there and provides more lift force for the vehicle to counter the increased weight at the rear of the vehicle.

An alternate version of the first embodiment of the same invention has the deck means of the vehicle, i.e. the deck and the side wall, circular in shape rather than generally trapezoidal, so that the vehicle is completely round. The footprint of this vehicle would usually be correspondingly circular. With the pressurization and propulsion means, described below, located toward one side of the vehicle and/or with a greater proportion of the load being toward one side of the vehicle, when the plenum is pressurized, the deck means may tilt slightly downward in view of the asymmetric load thereon and the vehicle footprint may change away from being completely circular to having a more oval shape. It is believed that this footprint shape will improve the directional stability of the vehicle.

In the first embodiment, a rudder is provided to the rear of the propulsive air flow and the rudder determines the direction in which the vehicle moves.

Where the propulsion means comprises a propeller, its air flow should be directed so as to provide most efficient propulsion. It is beneficial to house the propeller in a cowl, which is oriented to direct the air flow rearwardly of the vehicle counter to its direction of motion. The cowl prevents wasted centrifugal air flow. The inlet for air into the plenum is located inside the cowl.

In one embodiment, the plenum inlet is at the underside of the cowl. Means are provided in the cowl for dividing the air flow between the inlet to the plenum and the vehicle propulsion outlet from the cowl.

Air blown into the plenum pressurizes it. Necessarily, back pressure is generated in the plenum which returns through the inlet to the plenum and into the cowl. The air flow generated by the back pressure should be prevented from returning past the propeller through the inlet of the cowl. Additionally, a spinning propeller will blow air mostly in one direction, but some air will be blown by the tip vortices of the propeller blades in the reverse direction. Recapture of the air generated by the back pressure and the air that is blown in the reverse direction by the propeller blades, so that this air is again blown through the propeller, is recommended, as it reduces the need for a larger, heavier engine. For that purpose, an air dam is provided in the cowl forward or upstream of the propeller. The air dam comprises a collar on the inside of the cowl, which redirects any air moving upstream or forwardly of the vehicle back into the incoming stream of air entering the cowl and then rearwardly of the vehicle through the propeller.

In another embodiment, the propeller is partially located in a rotating duct in the cowl, which communicates into the plenum and the remaining part of the propeller spins in the cowl for providing propulsive air flow. As the propeller spins, the smaller diameter duct in the larger diameter cowl receives part of the air being moved through the cowl and delivers the air to the plenum. The duct is completely spanned by the propeller blades and blocks any return flow of air due to back pressure, avoiding the need for an air dam in the cowl.

A second embodiment of the invention provides means for controlling the start, stop, speed of the vehicle, turning of the vehicle, and even enables reverse movement of the vehicle, all by shutters and louvers which appropriately direct the propulsion portion of the air flow from the propeller, without need to change the rotation speed or rotation direction of the propeller. As before, the propulsive air flow from the propeller is directed out the rear of the cowl. At the rear of the cowl, there is a remotely controllable shutter adjustable between fully opening the rear of the cowl and fully closing the same and to positions between those two extremes. The extent to which the rear of the cowl is opened and closed will determine the air thrust rearwardly of the vehicle and determine the forward speed of the vehicle. When the shutter is completely closed, there is no rearward thrust, and the vehicle will not be moved forward under the force of air exiting through the rear of the cowl.

For steering the vehicle, respective independently operable louver means are located along the left and the right sides of the cowl. The louver means are operable for directing air almost rearwardly of the vehicle for forward thrust, for directing air laterally outwardly of the vehicle for pushing the rear of the vehicle to turn in the direction opposite the thrust of the air through the louvers and for directing air generally forwardly of the vehicle for moving the vehicle in the reverse or rearward direction. By appropriately opening the shutter at the rear of the cowl and by opening and directing the left and right louver means on the cowl, the vehicle can be moved forward at a desired speed and can be caused to turn left and right as it moves. Preferably with the shutter closed, one louver means can be oriented to blow air forwardly and the other to blow air rearwardly, and this will cause the air film supported vehicle to turn, even in its own length, on a vertical axis.

With the shutter fully closed, and with the louver means on both the left and right side oriented to redirect the air blown out the louver means in a direction toward the front of the vehicle, the forwardly moving vehicle will be braked to a halt. Continued orientation of the louver means in this manner will cause the air blown through the louver means to cause the vehicle to move to the rear, which is contrary to the direction which the propeller is blowing the propulsive air flow. While the vehicle is moving to the rear, adjustment of the louver means to control the direction in which the air is blowing determines the direction in which the vehicle turns as it moves rearwardly.

In the just described second embodiment, as in the first embodiment, there is a plenum defined beneath the deck means and a flexible, perforated sheet or membrane closes the bottom of the plenum. The vehicle of this embodiment is lifted in the same manner as in the first described embodiment.

In all embodiments, the propeller provides thrust toward the rear of the vehicle, but provides suction toward the front. As the air is suctioned into the front of the propeller, this will tend to draw the vehicle forward. However, if it is desired to drive the vehicle rearwardly, as described above in connection with the second embodiment, the suction force on the vehicle will drive it forward and at least partially defeat the air flow for moving the vehicle to the rear. In the second embodiment, an optional canopy or covering extends from the front of the cowl, forward to the front of the vehicle, and preferably inclines downwardly toward the front of the vehicle. The canopy blocks air from blowing into the propeller directly from the front of the vehicle.

To provide air to the propeller, at the bottom edge of the canopy along the sides of the vehicle and just above the deck, there is a short height gap between the bottom of the canopy and the top of the deck means, providing an air inlet pathway into the canopy along the sides of the vehicle. Sufficient air can be drawn into this inlet for efficient operation of the propeller. Because the air enters beneath the canopy from the sides of the vehicle, rather than entering from the front of the vehicle when there is no canopy over the propeller, the air being drawn under the canopy does not pull the vehicle forward and thus does not interfere with rearward motion of the vehicle. Additionally, of course, the canopy is decorative, hides the propeller and its drive and streamlines the vehicle. Cargo, or the like, may be covered by the canopy, and the canopy would prevent the profile of the cargo from interfering with the progress of the vehicle.

In its present embodiments, the invention is contemplated for a toy vehicle application. The invention, however, has potential for use as a full-sized vehicle for transporting people and/or freight.

Further variants are also contemplated in accordance with the invention. In one embodiment, the deck means is shaped to cooperate with two separated flexible sheets so as to define two plenums. One possible arrangement for such a vehicle comprises deck means in the form of an upper deck, the deck means being shaped at the respective location for each of the plenums to have a slanted or peaked form. An individual perforated flexible sheet is disposed beneath each of the plenum defining sections of the deck means. The deck means would be so shaped and the flexible sheets would be so placed that, in effect, the vehicle would be supported by pontoons, each defined by one of the flexible sheets. On top of the deck, the air pressure generating means, that is a propeller, is positioned. There may be individual inlets to each of the plenums from the air pressure generating means or a common plenum inlet may be defined, which then splits to divide the air flow to the separate plenums. Thereafter, each plenum acts as the plenum in the previously described embodiments, whereby the vehicle is jacked, lifted off the surface and then propelled, as before. The shape of the deck means and the cooperating flexible sheets are selected to give the vehicle the desired footprint for supporting the vehicle and for keeping the vehicle properly directed.

A vehicle comprised as just described would be quite useful for operating along a guide rail. The vehicle would straddle the rail, and then would be a respective plenum at each side of the rail. The flexible sheets would be large enough and the perforations would be so placed that there would be air flow from the plenums through the perforations directed at the rail as well as through perforations directed down against the surface over which the vehicle rides, so that the vehicle would touch neither the support surface nor the rail, but would be guided over the surface along the rail.

Especially with rail guided vehicles, but certainly not limited to them, a series or train of the vehicles might be provided, each being jacked, raised and propelled by air flow. The vehicles would be coupled together to move together in a train. This is particularly suitable for mass transit of people or for movement of large amounts of freight. Each of the vehicles in the series or train would have the same characteristics as the vehicle already described, and each may include its own air flow and air pressure generating means. However, where the vehicles are arranged in a train, it is also contemplated to provide only one of the vehicles in the train with the air flow and pressure generating means and to use that air flow and pressure generating means as the common source of air flow and pressure for the other vehicles in the train. Either the plenum in the first vehicle in the train communicates through an air duct with the next vehicle in the series, and so forth along the line, or there are separate air flow passageways communicating with the single air flow generating means and leading respectively to each of the vehicle plenums in the train. Because a vehicle according to the invention is provided with the perforated sheet for defining its plenum, the c.f.m. required for raising and propelling each vehicle is considerably less than is required with conventional open bottom air cushion vehicles. Enough air flow can be generated by the air flow generating means of one vehicle to supply sufficient c.f.m. to a number of vehicles in a train. This is to be contrasted with conventional open plenum air cushion vehicles where, as a practical matter, the air flow generating means of the vehicle generates only enough c.f.m. and air pressure to raise the vehicle on which the air flow generating means is situated.

All embodiments of the invention have a number of benefits in use. Air flows continuously out of the perforations in the flexible film sheet. As the vehicle moves forward, the pressurized air escaping from the perforations further toward the front of the vehicle remains beneath the flexible sheet and the vehicle moves forward over the temporary air cushion thereby developed. It is believed that movement of the vehicle over a surface is rendered easier because of the additional cushioning effect of the air exiting at the front of the vehicle serving as a cushion beneath the rear of the vehicle. With the air blowing back beneath the flexible sheet, the vehicle effectively planes on its own air cushion.

The invention is more effective in moving over an uneven surface, over voids and over upstanding obstacles than a conventional air cushion vehicle with an open bottom. When a conventional air cushion vehicle with an open bottom moves over an obstacle or over a void in the support surface, like a ditch or groove, it will rapidly lose the air in its open plenum through the gap which is defined as the vehicle rises over an obstacle or passes over the void, and the air cushion vehicle will then settle on its bottom periphery and not be able to move. With the invention, in contrast, the flexible, perforated sheet confines the air in a plenum reservoir and does not permit the bulk of the air to escape even as the vehicle rises over an obstacle or passes over a void, like a groove or ditch. The air still exits through the perforations generally at a constant rate, although when the vehicle passes over a void, the air flow is likely to be greater through those perforations not having a resistant surface beneath them. Nonetheless, the enclosure of the plenum bottom permits the vehicle of the invention to travel over rougher terrain than is possible with conventional air cushion vehicles. Conventional air cushion vehicles typically are used for travel over water and in the vicinity of water, as voids and surface obstacles are not a problem, while the present invention may be used either on water or over the ground. It is only necessary with the present invention that the vehicle be jacked high enough that the surface obstacles will pass beneath the underside of the depending side wall of the vehicle.

The shape of the vehicle is aerodynamically superior, which becomes beneficial as the travel speed of the vehicle is enabled to increase.

Another benefit of the air pressure in the plenum being relatively low arises in use of the vehicle for travel over water. Many low pressure jets of air escaping through the perforations in the flexible sheet are likely to bounce off the surface of the water and not break the surface tension of the water, thereby enabling the water to provide a surface off which the vehicle could be jacked. High pressure air or large diameter columns of air escaping from the plenum would be more likely to break the surface tension, preventing the vehicle from being jacked up. Also, the air flow escaping from all of the perforations, especially when the vehicle is moving, serves as a uniformly dispersed air cushion for the vehicle and this too assures that the surface tension of the water is not broken and the vehicle can be jacked and ride across the surface of the water.

BRIEF DESCRIPTION OF THE DRAWINGS

Other objects and features of the invention will become apparent from the following description of preferred embodiments of the invention considered in conjunction with the accompanying drawings, in which:

FIG. 4 is a front view thereof in the direction of arrows 4 in FIG. 5;

FIG. 5 is a longitudinal cross-sectional view thereof along the line of arrows 5 in FIG. 4;

FIG. 6 is a rear view thereof in the direction of arrows 6 in FIG. 5;

FIG. 7 is a longitudinal cross-sectional view of an alternate embodiment of the invention;

FIG. 8 is a front view thereof in the direction of arrows 8 in FIG. 7;

FIG. 14 is a side view of yet another embodiment of a vehicle according to the invention;

FIG. 15 is a top view thereof;

FIG. 16 is a front view thereof; and

FIG. 17 is a rear view thereof.

DETAILED DESCRIPTION OF THE PREFERRED EMBODIMENTS

Turning to FIGS. 1-6 showing the first embodiment of the invention, the vehicle 10 is comprised of a body 12, air flow generating pressurization and propulsion means 14 and a flexible sheet or membrane 20 beneath the body 12.

Figure 1:
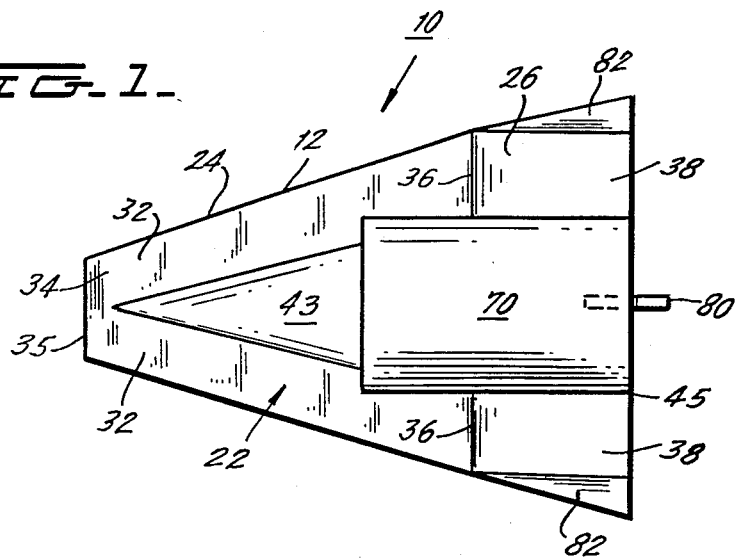
FIG. 1 is a top view of a vehicle according to the invention.
Figure 2:
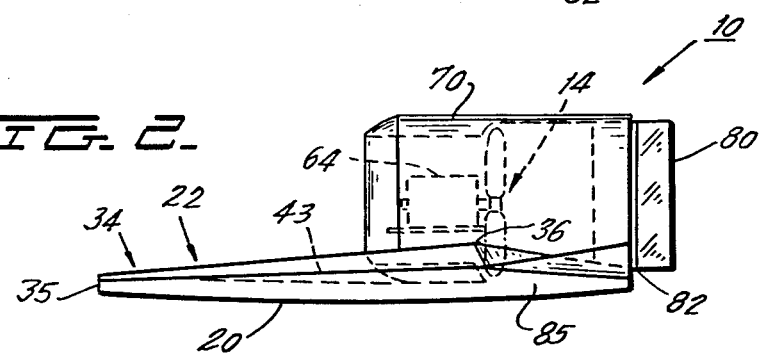
FIG. 2 is a side view thereof.
Figure 3:
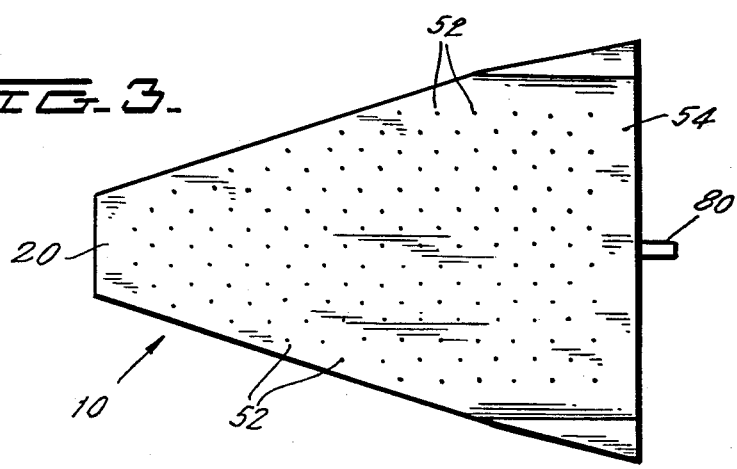
FIG. 3 is a bottom view thereof.

The body 12 is comprised of light weight, but rigid material such as thin wood or plastic. For best results and considering that the vehicle must be jacked by the air flow and must be propelled by air power, a light weight material should be used, but it must have the requisite strength and rigidity. The body 12 includes a generally flattened upper deck 22. Viewed from above, as can be seen in FIG. 1, the deck 22 has a generally trapezoidally shaped front portion 24 and a more rectangularly shaped, short front-to-back length, rear portion 26. In addition to narrowing in width toward the front 34 of the vehicle, the side sections 32 of the front portion 24 of the upper deck slant downward outwardly to the lateral sides of the vehicle, as can be seen in FIG. 4. These side sections 32 of the deck also slant downwardly moving forwardly of the vehicle, as can be seen in FIGS. 2 and 5, toward the shorter height front 34 of the vehicle and intersect the front side wall 35. The narrowing and shortening toward the front of the vehicle improves its air distribution and performance, as described in the earlier Summary section hereof.

Starting at the junction 36 between the front and rear sections 24 and 26 of the upper deck 22 and at the longitudinal center line 37 of the deck, the deck has rear panels 38, whicih slant downwardly moving both rearwardly and sideways outwardly of the vehicle. This is particularly important with respect to the undersurfaces 42 of the rear panels 38 of the deck as the undersurfaces 42 help define the air dispersion means in the plenum, as discussed further below.

The middle section 43, side to side, of the front portion 24 has a concavely rounded depression, serving as a continuation of the opening into the below-described cowl 70 of the propulsion means.

Around the entire periphery of the deck 22, there is a depending rigid side wall 35 at the front, 44 at the lateral sides and 45 at the rear. The side wall may be of the same material as the deck. The side wall extends down such that its entire bottom edge is generally in a plane. The height of the side wall would vary, therefore, depending upon the slant of the various sections of the upper deck which the side wall meets. It has a height dimension, completely around the vehicle, tall enough that an open plenum 85 may be defined beneath the entire upper deck 22 of the vehicle.

Secured to the bottom of the side wall 35, 44, 45 is the flexible, thin, bottom sheet or membrane 20. In order for the sheet 20 to be flexible, it cannot be taut across the bottom of the side wall, but instead it must be attached loosely, so that it is capable of pillowing to jack the vehicle when the plenum 85 is pressurized. Before inflation of the plenum, the sheet 20 may be somewhat loose, hanging down slightly as in FIGS. 4-6. Alternatively, the sheet may be comprised of an elastic, stretchable material which enlarges upon inflation of the plenum. The sheet may be comprised of any material with the flexibility required for the sheet to pillow in use and to deform over voids and surface obstacles. It must be tear resistant so as not to be damaged in moving over a rough surface or a sharp edge. Finally, since the entire weight of the vehicle when it is jacked up will cause a corresponding pressure to develop within the plenum, the material must be strong enough so as not to tear at that elevated pressure level. Materials that satisfy these requirements for a small sized, toy vehicle include a flexible polyethylene or polyproplylene film. Other suitable plastic sheet materials, metal foil materials or even paper materials may be devised and selected by one skilled in the air to satisfy the above-mentioned and below-described requirements.

The flexible sheet is perforated with small perforations 52 uniformly dispersed over it. The perforations are small enough that air will escape slowly through them while a pressure build-up may occur in the plenum. The greater the density of the perforations and the greater their cross-sections, the faster the air will escape through them and the more air pressure will be developed in the air cushion beneath the flexible sheet 20. Conversely, a greater amount of air will have to be delivered in the plenum in order to keep the sheet pillowed. The density of perforations and their cross-section must be balanced with the air pressure and c.f.m. to be developed in the plenum. In one suggested embodiment of a toy vehicle, the perforations are 0.036" in diameter with a density of 225 perforations per square inch, for example, but this will of course vary depending upon the pressure in the plenum. Also, the smaller the holes, the greater may be their density, and vice versa.

There are no perforations 52 on the entire margin 54 of the sheet 20, so that as the sheet pillows, initially jacking the vehicle, there is no waste of air escaping to the side of the pillowed sheet. It is only the air escaping through the perforations downwardly beneath the sheet that is of value in lifting the vehicle. Because of the shape of the vehicle, it has a footprint, when it is raised due to the plenum 85 being pressurized, that is generally in the shape of an egg, with the elongate, pointed end of the egg forward. As the pressure increases, the area of the footprint decreases, but its shape generally remains the same. The footprint is wider toward the rear of the vehicle, which not only supports the greater weight of the pressurization and propulsion means 14 which is toward the rear of the vehicle, but it also creates greater drag toward the rear of the vehicle, which keeps the vehicle directed with its front end forward, even after the vehicle turns, as described below, whereby skidding of the vehicle is avoided.

The pressurization and propulsion means 14 generates air flow that both raises the vehicle and propels it. The means 14 comprises the bladed propeller 60 which is supported and driven on shaft 62 through a conventional motor 64 which may be electric battery driven, fuel-driven, or the like. The propeller blades are angled with respect to their direction of spin that the propeller blows air to the rear 35 of the vehicle. The motor 64 sits upon a shelf 66 which spans across and is attached inside the cowl 70, described below. Immediately to the rear of the propeller is the rear portion 41, 42 of the upper deck of the vehicle and the portion of the air flow generated by the bottom portion of the propeller is directed beneath the surface 42 into the interior of the plenum 85, against the side wall at the rear 45 of the vehicle and beneath the rear panels 38, while the remainder of the air is blown over the top of the rear portion 41 of the deck beyond the vehicle for propelling the vehicle.

The entire air flow generated by the propeller 60 should be utilized and properly directed, with none of the air flow being wasted. Accordingly, a cylindrical cowl 70 surrounds the propeller and defines the pathway for the air flow generated by the propeller. The cowl is not a full cylinder, in that at its bottom toward the rear, it is defined as the rearward extension of the section 43 of the upper deck, and rearwardly of the propeller, the cowl has no under portion, as the air at the bottom of the propeller to the rear of the propeller is blown beneath the deck rear portion 41, 42. Forward of the propeller in the vehicle and upstream thereof in the air flow, the inner diameter of the cowl is narrowed at 72 upstream to the entrance to the cowl. The inner diameter of the cowl widens at the air dam 74. Any air blown forward of the vehicle by back pressure in the plenum 85 and any air blown forward by the tips of the propeller blades are redirected by the air dam 74 radially inwardly and then are sucked into the air flowing through the propeller 60, thereby avoiding return flow of air and any reduced efficiency resulting therefrom.

A rudder 80 is mounted outside of the cowl and to the rear of the vehicle and by conventional means (not shown, but any cable, lever or presetting may be selected), the rudder is moved so that one or the other side surface thereof has the air exiting the cowl 70 blowing upon it, which turns the vehicle. The footprint of the vehicle is selected that the vehicle will not skid after being turned.

The exterior of the vehicle body is finished with decorative, substantially non-functional panels 82.

The plenum 85 inside the body of the vehicle is a reservoir of air which serves to initially jack the vehicle and thereafter keep it upraised as it is being moved. Air enters the plenum at the open space in the upper deck 22 forward of the rear portion of the deck 41, 42 and this opening has as its front end the bottom portion 75 of the air dam in the cowl. Air entering the plenum first impinges upon the inclined underside 42 of the rear of the deck, where the air is dispersed and caused to spin and change direction and move sideward and forward and around inside the plenum. The air strikes the rear interior surface 86 of the rear wall 45 within the plenum and thereafter is also dispersed from here. The air moves under the panels 38 and forward through the plenum. The plenum 85 is continuously open due to the shaping of the upper deck 22 and the peripheral side wall 44 of the vehicle and the air dispersal means just assures that the air is distributed throughout the normally open plenum.

As the propeller 60 spins, it blows air into the plenum 85, which will jack the vehicle, and also blows the air back over the top of the rear portion 41 of the deck for propelling the vehicle in the direction opposite the direction in which the air is blown by the propeller 60. To jack the vehicle more and/or to increase its speed, the propeller is adjusted to blow air at a faster rate.

Various modifications in the shape of various elements, elimination of the cowl, alteration in the air flow generating means, variations in the shape of the body of the vehicle, etc., would be apparent to one skilled in the art for accomplishing the objects of the invention.

Figure 9:
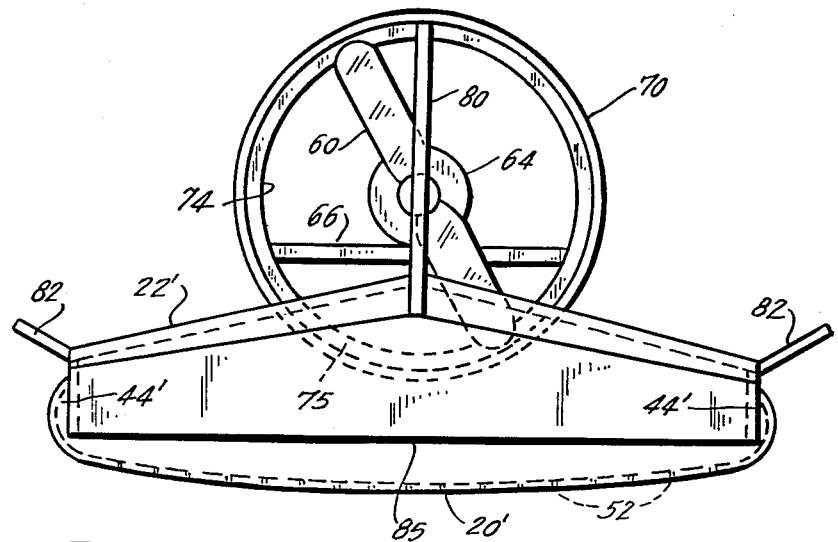
FIG. 9 is a front view of yet another embodiment.

For example, in FIG. 9, the flexible sheet is not secured to the bottom of the side wall 44' of the vehicle, but is instead secured higher up on the side wall 44', nearer to the upper deck 22'. The enlargement of the sheet 20' permits higher jacking of the vehicle upon inflation of the plenum 85.

The second embodiment of FIGS. 7 and 8 differs from the first embodiment only with respect to the air flow generating means 90 and the manner in which air flow is introduced into the plenum. The air flow generating means 90 which is there illustrated includes a four-bladed propeller 92 which is otherwise similar in function and design to the two-bladed propeller 60 of the first embodiment. A motor 64 drives the propeller 92 through the drive shaft 62. In either embodiment, various propeller blade combinations might be substituted.

In this embodiment, the propeller is integrated into and is located part way along a smaller diameter, annular duct 94 which rotates together with the propeller about the same axis, defined by the drive shaft 62. The duct 94 projects both forward or upstream of the propeller 92 and rearward or downstream of the propeller. The rotatable duct 94 fits closely, but is not in contact with or friction fit with, over the front portion 96 of the entry duct 100 into the plenum 85. The front portion 96 of the entry duct 100 effectively serves as a continuation of the duct 94. The duct 100 bends downwardly and passes through the otherwise closed upper deck panel 101 of the vehicle and into the plenum 85. Once it has entered the plenum, the orientation of the duct 100 changes again so that the outlet 102 therefrom, which is located almost at the rear side wall 45 of the vehicle, blows forwardly through the plenum 85, thereby avoiding the need for the air dispersion means 42, 86, 38 of the first embodiment.

The air flow which is used for jacking the vehicle thus is the portion of the air flow that is radially closer to the drive shaft 62. The air flow generated by the sections of the propeller blades radially outside the duct 94 all flows past the rear of the vehicle for propelling the vehicle. The duct 100 passing down into the plenum 85 obstructs some of the air flow rearwardly, whereby the exterior profile of the duct 100 is altered to be generally triangular with the apex 104 facing forwardly to reduce the obstruction to through-flow of the air and to resultant c.f.m.

There is a significant benefit of the second embodiment of FIGS. 7 and 8, as compared with the embodiment of FIGS. 1 and 2. In the embodiment of FIG. 1, as pressure builds up in the plenum 85, a back pressure develops and this can escape through the plenum entrance adjacent the rear of the propeller. In contrast, in the second embodiment, there is no clearance space between the plenum and the propeller, as the propeller is part way down the duct 94, whereby there is no open path for the air to escape back through the duct 94. This eliminates the need for the air dam 74 of the first embodiment, although such an air dam still might be provided for redirecting air pushed in the upstream direction by the propeller blade tips.

Other features of the second embodiment correspond to those of the first embodiment and are not shown. The cowl 71 of the second embodiment is generally similar to the cowl 70 of the first embodiment, except the air dam may be eliminated, as discussed just above.

There have just been described a number of embodiments of an efficient vehicle which is capable of being both lifted and propelled by air flow and which is capable of traveling over a rougher surface than conventional air-cushion vehicles and which is likely to require less energy to lift and propel than conventional air-cushion vehicles.

Figure 10:
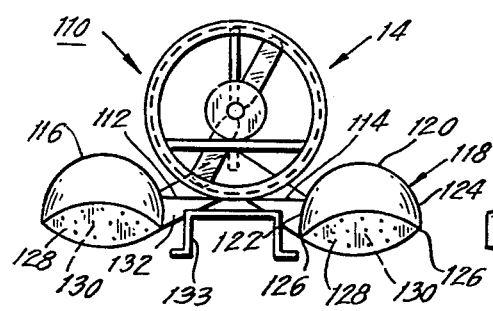
FIG. 10 is a front view of a further embodiment of the vehicle including a plurality of plenums.
Figure 11:
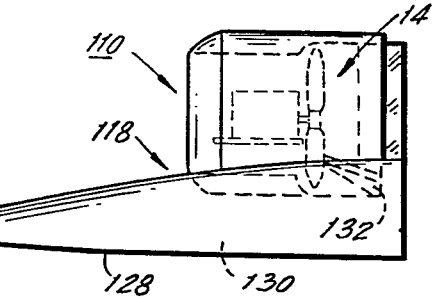
FIG. 11 is a side perspective view of the vehicle of FIG. 10.

A quite different embodiment of the invention, based upon the principles of the earlier embodiments, is now described. With reference to FIGS. 10 and 11, the vehicle 110 comprises the upper deck 112 which is rigid. Unlike the upper deck 22 of the first embodiment, this deck has a center portion 114 which is essentially flat and has two side sections 116 and 118. One of these is now described. The section 118 is profiled so as to be generally rounded at the top 120 and then has downwardly outwardly sloping sides 122 and 124. The rounded section 120 of the deck is completely open on the bottom, and terminates at the peripheral lower edge 126. A flexible, perforated sheet 128 extends across the open space defined by the bottom edge 126, and thereby defines an enclosed, but open or hollow plenum chamber 130. Two chambers 130, similarly comprised, are illustrated. Additional ones of the plenum chambers may be provided by similarly configuring the upper deck and/or the peripheral side walls thereof and supplying a perforated sheet beneath each such plenum. The number of such plenums and their size are selected so that sufficient lift is provided to raise the vehicle off the support surface that the vehicle could then be propelled in the manner described for the previous embodiments.

As in the prior embodiments, propulsion and lift are provided by the air pressure generating means 14 comprised of a propeller in a cowl. The entrance pathway from the cowl is a separate path to each of the plenums 130 and comprises a conduit 132 for each plenum.

The vehicle 110 of this embodiment having plenums arrayed along the opposite lateral sides of the vehicle is particularly adapted for travel along a guide or rail 133 or a pair of spaced apart rails, as appropriate. The rail 133 between the two plenums guides the motion of the vehicle. Furthermore, this arrangement is particularly useful in connection with a train of vehicles, as discussed with reference to FIGS. 12 and 13. The rail 133 is of a height to project up past the inwardly facing opposing sides of the plenums. When the vehicle is jacked up and both perforated sheets 128 are distended by inflation of the plenums, the perforations nearer to the inside edges 126 of the two deck sections 120 are aimed inwardly toward the rail 133. Most of the perforations blow air down to raise the vehicle, and other perforations blow air inwardly against the rail to center the vehicle on the rail. Furthermore, the perforations define an air cushion with respect to the rail, so that there is no direct rubbing or frictional contact. Due to the absence of friction contact with the rail and with the ground, the speed of the vehicle can be increased without significant wear and friction losses.

Figure 12:
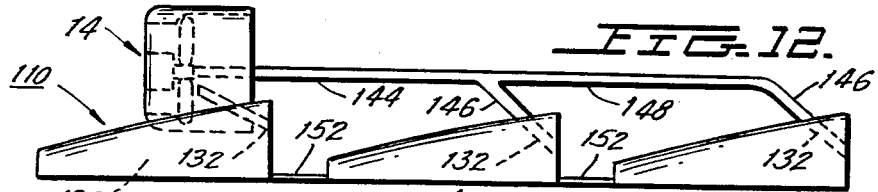
FIG. 12 is a side view of a train of the vehicles, coupled according to one embodiment.
Figure 13:
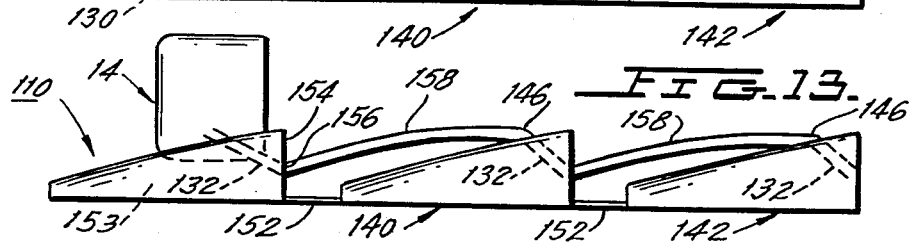
FIG. 13 is a view similar to FIG. 12, with the vehicles being coupled according to another embodiment.

FIGS. 12 and 13 respectively show two different embodiments of a series or train of vehicles. A vehicle 110 is in the lead of each train. Behind that vehicle are unpowered vehicles 140 and 142. The number of vehicles that may be coupled behind the leading, powered vehicle is limited by the c.f.m. required to lift and propel all of the vehicles in the train. The vehicles 140 and 142 would have the same general shape and construction as the vehicle 110, except that there would not be a separate air flow generating means 14 provided on the vehicles 140, 142. Instead, air for lifting each of the succeeding vehicles in the train is supplied from the air generating means on the lead vehicle 110.

In the embodiment of FIG. 12, the air flow generating means has the above-described conduits 132 directing air into the individual plenums 130 of the lead vehicle 110. Additionally, another duct similar in form to the duct 94, 100 of FIGS. 7 and 8 would extend from the center of the air flow generating means 14 in FIG. 12 to the inlet 146 for the plenums of the vehicle 140. Within the vehicle 140, the previously discussed inlet conduits 132 would be provided. That same conduit 144 would continue at 148 to the inlet 146 of the next vehicle 142 in the train and the air flow would enter that vehicle as well though its respective entrance conduit 132, and so forth for as many vehicles as are provided in the train. A conventional mechanical coupling 152 joins the vehicles in the train.

The embodiment of FIG. 13 differs from that of FIG. 12 in that air supplied to each vehicle 140, 142 behind the lead vehicle 110 is provided not directly from a conduit communicating with the air flow generating means, but instead from a conduit communicating with the plenum of the preceding vehicle in the train. Air flow into the lead vehicle 110 in FIG. 13 is through the plenum 153. The rear wall 154 of that vehicle has an outlet 156 from which a conduit 158 extends, and this conduit projects into the inlet 146 of the next vehicle 140 in the line. Again, the vehicle 140 has an outlet 156 at its rear wall and through another conduit 158, there is communication to the plenum entrance 146 on the next vehicle 142, and so forth for each successive vehicle in the train.

With either of the embodiments of FIGS. 12 and 13, therefore, the air flow generating means 14 on the lead vehicle generates enough c.f.m. and air pressure not only to pressurize and therefore lift all of the vehicles in the train, but sufficient force is directed rearwardly of the lead vehicle to drive the entire train of vehicles forward. If there are too many vehicles for one air flow generating means to raise and propel all of the vehicles in a train, a plurality of the vehicles with the air flow generating means may be provided in the train either at the front of the train or at spaced intervals, as is conventional with railroad trains. These embodiments are particularly useful in connection with mass transit of people and with transport of freight, since movement of the vehicles along the rail is rendered efficient due to the lack of actual friction contact between the vehicle and the surface and rail over which the vehicle travels.

A second embodiment of a vehicle of the type shown in FIGS. 1–6 appears in FIGS. 14–17. Many of the elements of this second vehicle embodiment correspond to elements of the first vehicle embodiment. The corresponding elements shall not be described in detail. They will be identified with reference numerals corresponding to the reference numerals of the first embodiment, but raised by 200. Elements new in this embodiment and previously described elements which are different in this embodiment are described below.

The vehicle 210 is comprised of the body 212, the propulsion means 214 and a flexible sheet or membrane 220.

In this embodiment, the body 212 includes the substantially completely flat upper deck 302, which extends from the front 235 of the body rearwardly to the front of the cowl 270. Unlike the upper deck 22 of the first embodiment, the upper deck 302 is flat, not upraised. This is permitted because the c.f.m. of the air flow provided by the propeller 260 is sufficient for pressurizing the entire volume of the plenum 285 between the deck 302 and the membrane 220. The cowl 270 sits on the deck, and no depression, like depression 43, is required in the deck leading to the front of the cowl. The upper deck 302 extends past the lateral sides of the cowl 270 to the rear of the vehicle. There is no opening into the plenum 285 through the deck 302.

Around the entire periphery of the deck 302, there is a downwardly depending, rigid, rather short height, side wall 304 which may be of the same material as the deck. The wall extends down to define an open plenum 285. The flexible sheet or membrane 220 is secured at the bottom of the peripheral side wall 304. The sheet 220 is of only slightly greater area than the area defined by the side wall 304, since the sheet 220 need pillow only to a very small extent for the benefits of the invention to be realized. However, if the vehicle is intended to travel over a rougher surface, e.g. over ground which has obstacles on it or which changes in height and inclination, then the sheet should have greater area, so that it would pillow more and the vehicle would be able to negotiate the greater obstacle it will be facing.

The placement of the deck 302 and the height of the side wall 304 cause the plenum 285 to be of short height. With sufficient c.f.m. of air generated by the propeller 260, the short plenum is adequate. This can give the vehicle a smaller height front area, and would reduce the wind resistance to forward motion of the vehicle, as contrasted with a much larger, more wind resistant front area required with most ground effect vehicles.

Above the peripheral marginal area of the deck, there is a flat plate 306 which extends around the area of the deck in front of the propeller and extends past the cowl 270 to the rear of the vehicle. At the cowl, the area beneath the plate 306 is closed for confining air entering the below described plenum entrance 310. In front of the cowl 270, the space between the deck 302 and plate 306 is open, defining the gap 307 for air inlet if the below described canopy 360 is in place. Posts 309 support the plate 306 above the deck 302.

Rearward of the propeller 260 and inside the cowl 270, the deck 302 is open and the cylindrical cowl 270 is open at its bottom, defining the large area entrance opening 310 into the plenum 285. Extending across the entire width of the cowl above the deck 302 and extending from its front edge 265 immediately behind the propeller 260 to rear end 267 of the cowl is a flat shelf 266 on which sits the motor 264 for the propeller 260 and a conventional radio-controlled servo control 269 for the motor. The servo control communicates with the motor 264 by a rod and the servo is connected to adjust the speed of the motor and turn it on and off.

The air from the upper portion of the path of the propeller above the shelf 266 is available for propulsion and redirection of the vehicle, as described below.

In contrast with the first embodiment, the propeller 260 is located forward of its motor 264, instead of rearwardly thereof. The air dam 274 in the cowl performs the same function as the dam 74 in the first embodiment. The motor 264 is air cooled and is thus exposed behind the propeller.

The servo control 269, in contrast to the motor 264, is covered by a fairing 290 or shroud which starts from its pointed tip 291 and enlarges to its rear end at the rear 267 of the cowl. The fairing 290 has the outwardly inclined sides 292, 293 and the top 294 and it is closed over the bottom by the shelf 266. The outward inclines of the sides 292, 293 cause them to redirect the air that blow rearwardly past them somewhat laterally outwardly so that it impinges upon the below described louver means 332, 334. When the below described shutter 320 is closed, this air redirection is important for moving the air through the louver means with less turbulence than if the air were blown straight rearward against the closed shutter.

To the rear of the motor 264 and directly beneath the shelf 266, the panels 314, 316 are placed inside the cowl and close off the rear of the cowl beneath the shelf 266 and direct the air blown off the bottom portion of the path of the propeller down through the opening 310 and into the plenum 285. The incline of the panels 314, 316 and the fact that they communicate with the rear of the plenum and of the vehicle causes the air to circulate forward through the plenum. The plenum 285 in the second embodiment is essentially similar to the plenum 85 of the first embodiment, is supplied with air substantially in the same manner as in the first embodiment and it functions in the same manner in connection with lift of the vehicle.

The primary difference between the second embodiment and the first embodiment is in the control over the speed and direction of the vehicle. For a vehicle which is not large enough to carry its own operator, such as a toy, the control over the operation of the vehicle must be remote control. Conventional radio controls for the functions of toy vehicles, or the like, are known. Hereafter various servo controls will be referred to for various elements in the vehicle. These could be understood to be conventional radio controls or other such servo controls, perhaps cable controls connected to a control means, or any other servos of the type that would be well known to persons skilled in the toy art and in the servo control art. Accordingly, specific servo controls are not described herein.

For controlling the amount of jacking of the vehicle, the pillowing of the flexible sheet 220 and the speed of the vehicle, the rate of rotation of the propeller 260 could be controlled by the servo control 269. However, the operation of the vehicle herein described permits the motor 264 to deliver a constant power level so that the propeller 260 will be rotated at substantially a constant rate by the motor 264.

Control over the speed of the vehicle, especially in the forward direction, is obtained through a controllable thrust controlling shutter 320. The shutter 320 has the shape of a section of a circle, less than a semicircle. The shutter 320 extends over the entire width of the cowl. It pivots on the pivot 322 located at the rear 267 of the cowl. The rear edge of the upper wall 294 of the fairing 290 provides a convenient location for the pivot 322. When the shutter is open, its upper, rounded portion moves into the cowl while its lower portion projects out of the cowl. Therefore, the shutter controls the opening of the rear 267 of the cowl from the area at about the height of the shelf 312 up to the top of the cowl 270. The area 267 below the shelf 266 at the rear 267 of the cowl is closed off since none of the propulsive air flow exits below the shelf.

A servo motor 326 is conventionally connected with the shutter 320 for controlling the extent to which the shutter opens. The extent to which the shutter 320 is open determines the c.f.m. of air directed rearwardly of the vehicle for propulsion and thus determines the forward thrust upon the vehicle. This, in turn, sets the speed of the vehicle. With the shutter 320 completely closed, there is no rearward flow of air and thus no forward thrust upon the vehicle, in addition to or as an alternative to the action of the servo control 269 on the motor 264. With the shutter 320 closed and with the propeller 260 spinning, the vehicle will still not move forward. This is useful with respect to causing rearward motion of the vehicle, in the manner to be described below.

For controlling the direction in which the vehicle turns as it moves, respective louver means 332 are provided along the left side of the cowl 270 and 334 are provided along the right side of the cowl 270. The louver means 332 is high enough on the cowl to be above the motor support shelf 312 and is also located at the height of the opening 321 at the rear of the housing which is covered by the shutter 320. Thus, air which moves rearwardly out of the rear 267 of the housing will pass by the louver means and will pass through the louver means if its louvers are oriented to permit this. The side walls 292, 293 of the fairing assure the air flow is directed as described. The louver means 332, 334 are independent of each other and each is operated by its respective servo motor 336, 338 which is remotely controlled by an operator.

The louver means 332 are now described, it being understood that the louver means 334 are essentially mirror images, but otherwise the same. The louver means 332 include a housing 342 which projects out from the left side of the cowl 270. That housing is open on the interior wall 344 thereof facing directly into the cowl so that there is unobstructed access of the air flowing in the cowl to pass into the louver housing 342. The exterior wall 346 of the housing 342 opens to the side of the vehicle. A plurality of identical vanes or louvers 350 are supported between the top and bottom walls of the housing 342 to pivot around their respective centrally located pivots 352. All of the louvers 350 are connected at their inward ends to the servo motor 336. The motor 336 can pivot the louvers from an orientation where they are in contact with each other to block any flow out through the housing 342 to the position illustrated where the louvers will direct air both rearwardly and laterally outwardly and further to a position where the louvers will direct air laterally outwardly, but also forwardly. Depending upon the orientation of the louvers 350, which all move together, that will direct the air flow from the cowl through the housing 342 and out the housing wall 346.

Control over the speed and direction of movement of the vehicle is obtained through operation of the shutter servo motor 326 and the louver means servo motors 336 and 338. For controlled movement forward, the louvers of the louver means are closed and the shutter 320 is open to a varying extent, depending upon the desired forward speed. For turning the vehicle to the right as it moves forward, the shutter 320 remains open and the louver means 334 is operated to direct air out to the right side and to the rear, which would shift the rear of the vehicle toward the left and would turn the front of the vehicle toward the right. To turn the vehicle to the left, the left louver means 332 is operated to direct air out to the left side and to the rear, which would shift the rear of the vehicle to the right.

This vehicle can even turn in its own length or while it is not advancing forward or rearward. With the shutter closed, one louver means is directed to blow air forwardly while the other is directed to blow air rearwardly. The vehicle supported on a film of air can simply rotate around a vertical axis due to the oppositely directed forces on its opposite lateral sides.

To stop forward progress of the vehicle, the shutter 320 is closed, and the louver means 332 and 334 are also closed and the vehicle will coast to a stop on the film of air. But, the louver means can be operated to brake the vehicle by orienting the louvers of the louver means so that they blow air to the side and, most important, toward the front of the vehicle. (Because the louver means are located in the sides of the vehicle, they are able to blow air forward by blowing it obliquely outward and forward.) With the louver means directed so that air flow through both is balanced and so that the air flow through both is directed out at the same angle with respect to the axis of the vehicle, the vehicle will be braked to a halt on the film of air. The still closed shutter 320 does not interfere with braking. This is significant because vehicle braking occurs without the need to change the speed or pitch of the propeller 260. Once the vehicle has been stopped, if the louver means 332 and 334 are kept open, the force of the air exiting through the louver means may be sufficient to move the vehicle, when this is not desired. If there is a danger of excessive back pressure on the propeller, and the propeller motor is not turned off, then both louver means may be directed to blow air straight out sideways, whereby the air flow from both louver means will neutralize each other and the vehicle will remain stationary.

It has been found that the vehicle can be operated in the rearward direction by closing the shutter 320 and by orienting the louvers of the louver means so that they blow the air to the side of and also toward the front of the vehicle. This provides sufficient force to move the vehicle to the rear, which is the direction contrary to the direction in which the propeller 260 is blowing air. Of course, the rearward motion of the vehicle is aided by the fact that the vehicle is riding on a film of air which is exiting through the perforations in the sheet 220.

Were the front of the second embodiment 210 of the vehicle substantially the same as in the first embodiment 10, the top of the deck 302 would be uncovered and there would be clear access to the front of the cowl 270. However, for esthetic reasons, for streamlining the vehicle and also to avoid the forwardly directed component of force on the vehicle which would result from the suction force at the front of the propeller 260, an optional light weight, rigid canopy 360 completely covers the volume above the deck 302 and inboard of the inner edge of the peripheral plate 306 and back to the front of the cowl 270. But, it meets and wraps around the top and the upper parts of the sides of the cowl and down to the plate 306. The canopy is secured to the inner edge 361 of the plate 306. Cargo, or the like, which might be carried on the deck 302 would be covered by the canopy 360.

Since the canopy blocks air that would flow to the front of the propeller 260, a pathway for in-flowing air to the propeller must be provided. For this purpose, the relatively short height gap 309 between the deck 302 and the plate 306 along the sides of the front portion 224 of the body 212 provides an air inlet. Air simply passes through the gap 309 and under the canopy to the propeller 260. While the sides of the body are open to provide the gap 309, there is a blocking piece 368 at the front of the body which blocks entrance of air into the area above the deck 302 from the front. Thus, air is drawn into the area in front of the propeller 260 from the sides of the vehicle, and not from the front, so that there is no in-flow into the vehicle from the front. This facilitates reverse direction movement of the vehicle.

In other respects, this embodiment would operate like the embodiments of FIGS. 1–9, described above.

Although the present invention has been described in connection with a plurality of preferred embodiments, many variations and modifications will now become apparent to those skilled in the art. It is preferred, therefore, that the present invention be limited, not by the specific disclosure herein, but only by the appended claims.

What is claimed is:

1. A vehicle which rides on an air cushion and which is propelled by air, comprising:

upper deck means, having a bottom edge which defines the periphery of an area;

a thin, flexible sheet located below the upper deck means, extending beneath the bottom edge and secured beneath the bottom edge for defining a plenum that is defined by and closed off by the upper deck means and the sheet; the deck means being shaped within the area defined by its bottom edge for causing the plenum to always be an open space and the upper deck means being rigid enough to maintain that open condition of the plenum; the sheet being secured in a manner permitting the sheet to pillow when air is pressurized in the plenum;

the sheet being perforated below the upper deck means for permitting exit of air from the plenum at a controllable rate through the perforations; the sheet having a large plurality of the perforations dispersed over most of its area below the upper deck means; each of the perforations being a hole;

air pressure generating means; a plenum inlet for communicating air from the generating means into the plenum for pressurizing the plenum, whereby the sheet may pillow and air may escape through the perforations, for both jacking up the upper deck means and for creating an air cushion between the sheet and the surface over which the vehicle moves; the upper deck means having the plenum inlet for air from the air pressure generating means defined therein and the upper deck means being inclined down toward the sheet, moving away from the plenum inlet, for diminishing the height of the plenum away from the plenum inlet; and air propulsion means connected with the vehicle for propelling the vehicle once it is raised on the air cushion.

2. The vehicle of claim 1, wherein the vehicle has a front with respect to the direction in which it is to be propelled, a rear opposite the front and lateral sides extending from the front toward the rear.

3. The vehicle of claim 2, wherein the upper deck means inclines down toward the sheet laterally out toward the lateral sides of the vehicle.

4. The vehicle of claim 3, wherein the plenum inlet is toward the rear from the front of the vehicle and wherein toward the front of the vehicle from the plenum inlet, the upper deck means inclines downwardly for diminishing the height of the plenum toward the front of the vehicle.

5. The vehicle of claim 4, wherein the upper deck means and the sheet are shaped to gradually widen the plenum, lateral side to lateral side, from the front of the vehicle rearwardly toward the plenum inlet.

6. The vehicle of claim 4, further comprising air dispersion means located in the plenum for dispersing around the plenum the air flowing into the plenum inlet; the air dispersion means comprising the plenum inlet comprising an inlet opening in the upper deck means downwstream of the air pressure generating means; the upper deck means, downstream of the inlet opening, having an underside which is inclined rearwardly and downwardly toward the sheet, terminating at the rear of the vehicle, whereby the underside of the deck means may redirect and thereby disperse air flow entering the plenum.

7. The vehicle of claim 6, wherein to the lateral sides of the inlet opening in the upper deck means, and downstream of the inlet opening, the underside of the upper deck means is inclined downwardly toward the sheet, laterally outwardly to the lateral sides of the vehicle, while also being inclined downwardly toward the rear of the vehicle, whereby the underside of the deck means may redirect and thereby disperse air flow entering the plenum.

8. The vehicle of claim 7, wherein the upper deck means, toward the front of the vehicle from the plenum inlet, inclines downwardly toward the sheet for diminishing the height of the plenum toward the front of the vehicle.

9. The vehicle of claim 8, wherein the upper deck means and the sheet are shaped to gradually widen the plenum, lateral side to lateral side, from the front of the vehicle rearwardly toward the plenum inlet.

10. The vehicle of claim 6, wherein the upper deck means comprises an upper deck and a peripheral side wall depending beneath the upper deck, and the bottom edge of the upper deck means being defined at the bottom edge of the side wall; the side wall extending around the entire periphery of the plenum, and the upper deck and the side wall together having sufficient rigidity for keeping the plenum continuously open.

11. The vehicle of claim 1, wherein the upper deck means comprises an upper deck and a peripheral side wall depending beneath the upper deck, and the bottom edge of the upper deck means being defined at the bottom edge of the side wall; the side wall extending around the entire periphery of the plenum, and the upper deck and the side wall together having sufficient rigidity for keeping the plenum continuously open.

12. The vehicle of claim 11, wherein the flexible sheet is secured at the bottom edge of the side wall.

13. The vehicle of claim 1, wherein there are a plurality of the flexible sheets, and the upper deck means is shaped to have separate sections thereof, below each of which sections a respective one of the flexible sheets extends, for defining respective plenums at the upper deck means and at each respective sheet; the upper deck means being shaped at each plenum for defining a respective bottom edge for cooperating with the respective sheet;

a respective plenum inlet for each plenum and the air pressure generating means communicating into the respective plenum inlets for pressurizing each plenum of the vehicle.

14. The vehicle of claim 13, wherein the upper deck means is shaped such that the plenums are defined along the opposite lateral sides of the vehicle, and there is a space between the plenums running along the front to rear length of the vehicle.

15. In combination, the vehicle of claim 14 and a second vehicle, which also rides on an air cushion;

the second vehicle comprising second upper deck means having separate sections thereof and each section having a second bottom edge which defines the periphery of a respective second area;

a respective second thin flexible sheet located below each section of the second upper deck means and extending beneath the respective second bottom edge of that section and secured beneath the second bottom edge for defining a respective second plenum that is defined by and closed off by the respective section of the second upper deck means and the respective second sheet; the second deck means being shaped within the second areas defined by its second bottom edges for causing the second plenums to always be open spaces, and the second deck means being rigid enough to maintain the open condition of the second plenums; the second sheets being secured in a manner permitting the second sheets to pillow when air is pressurized in the second plenums;

each second sheet also being perforated below the second upper deck means for permitting exit of air from the second plenum at a controllable rate through the respective perforations; a second plenum inlet to each second plenum of the second vehicle; the air pressure generating means communicating to the second plenum inlets for pressurizing the second plenums, whereby the second sheets may pillow and air may escape through the perforations thereof, for both jacking up the second upper deck means and for creating an air film between the second sheets and the surface over which the second vehicle moves; and means coupling the first-mentioned vehicle and the second vehicle for moving the vehicles together as the first-mentioned vehicle is propelled.

16. In combination, the vehicle of claim 1 and a second vehicle, which also rides on an air cushion;

the second vehicle comprising second upper deck means having a second bottom edge which defines the periphery of a second area;

a second thin flexible sheet located below the second upper deck means and extending beneath the second bottom edge and secured beneath the second bottom edge for defining a second plenum that is defined by and closed off by the second upper deck means and the second sheet; the second deck means being shaped within the second area defined by its second bottom edge for causing the second plenum to always be an open space and the second deck means being rigid enough to maintain the open condition of the second plenum; the second sheet being secured in a manner permitting the second sheet to pillow when air is pressurized in the second plenum;

the second sheet also being perforated below the second upper deck means for permitting exit of air from the second plenum at a controllable rate through the respective perforations; a second plenum inlet to the second plenum of the second vehicle; the air pressure generating means communicating to the second plenum inlet for pressurizing the second plenum, whereby the second sheet may pillow and air may escape through the perforations thereof, for both jacking up the second upper deck means and for creating an air film between the second sheet and the surface over which the second vehicle moves; and means coupling the first-mentioned vehicle and the second vehicle for moving the vehicles together as the first-mentioned vehicle is propelled.

17. The combination of claim 16, wherein the air pressure generating means and the air propulsion means are mounted on the first-mentioned vehicle.

18. The combination of claim 17, wherein the air pressure generating means and the air propulsion means comprise a single source of pressurized air mounted on the first-mentioned vehicle and they also comprise dividing means for dividing the flow of pressurized air, part into the plenum of the first-mentioned vehicle and part external to the plenum of the first-mentioned vehicle for propelling the first-mentioned vehicle.

19. The combination of claim 18, wherein the air pressure generating means communicates to the second plenum through a duct communicating from the single source of prressurized air to the second inlet of the second plenum.

20. The combination of claim 17, wherein the air pressure generating means communicates to the second plenum through a duct communicating between the plenum of the first-mentioned vehicle and the second inlet of the second plenum of the second vehicle.

21. A vehicle which rides on an air cushion and which is propelled by air comprising:
upper deck means, having a bottom edge which defines the periphery of an area;
a thin, flexible sheet located below the upper deck means, extending beneath the bottom edge and secured beneath the bottom edge for defining a plenum that is defined by and closed off by the upper deck means and the sheet; the deck means being shaped within the area defined by its bottom edge for causing the plenum to always be an open space and the upper deck means being rigid enough to maintain that open condition of the plenum; the sheet being secured in a manner permitting the sheet to pillow when air is pressurized in the plenum;
the sheet being perforated below the upper deck means for permitting exit of air from the plenum at a controllable rate through the perforations; the sheet having a large plurality of the perforations dispersed over most of its area below the upper deck means; each of the perforations being a hole;
air pressure generating means; a plenum inlet for communicating air from the generating means into the plenum for pressurizing the plenum, whereby the sheet may pillow and air may escape through the perforations, for both jacking up the upper deck means and for creating an air cushion between the sheet and the surface over which the vehicle moves; the vehicle having a front with respect to the direction in which it is to be propelled and a rear opposite the front; the plenum inlet being toward the rear from the front of the vehicle; the upper deck means and the sheet having lateral sides extending from the front toward the rear; and the upper deck means and the sheet being shaped to gradually widen the plenum, the lateral sides widening in distance from each other as they extend from the front of the vehicle rearwardly toward the plenum inlet; and
air propulsion means connected with the vehicle for propelling the vehicle once it is raised on the air cushion.

22. A vehicle which rides on an air cushion and which is propelled by air, comprising:
upper deck means, having a bottom edge which defines the periphery of an area;
a thin, flexible sheet located below the upper deck means, extending beneath the bottom edge and secured beneath the bottom edge for defining a plenum that is defined by and closed off by the upper deck means and the sheet; the deck means being shaped within the area defined by its bottom edge for causing the plenum to always be an open space and the upper deck means being rigid enough to maintain that open condition of the plenum; the sheet being secured in a manner permitting the sheet to pillow when air is pressurized in the plenum;
the sheet being perforated below the upper deck means for permitting exit of air from the plenum at a controllable rate through the perforations;
air pressure generating means; a plenum inlet for communicating air from the generating means into the plenum for pressurizing the plenum, whereby the sheet may pillow and air may escape through the perforations, for both jacking up the upper deck means and for creating an air cushion between the sheet and the surface over which the vehicle moves;
air propulsion means connected with the vehicle for propelling the vehicle once it is raised on the air cushion;
the air pressure generating means and the air propulsion means comprising a single source of pressurized air mounted on the vehicle and dividing means for dividing the flow of pressurized air, part into the plenum inlet and part external to the plenum for propelling the vehicle; the single source of pressurized air comprising a propeller mounted for blowing air in the direction opposite the direction of propelled motion of the vehicle and means for driving the propeller to blow air into the plenum inlet and also past the vehicle for propelling the vehicle;
a cowl around the propeller and in which the propeller rotates, the cowl having an upstream entrance for transmitting air to the propeller and having a downstream exit downstream of the propeller, the cowl exit being placed and shaped for emitting air in the direction opposite the direction of propelled motion of the vehicle; and
an air dam in the cowl, just upstream of the propeller in the air flow through the cowl, the air dam projecting radially in slightly from the periphery of the cowl for redirecting, radially inwardly of the propeller, air moving through the cowl in the reverse of the direction of air blown through the cowl by the propeller.

23. The vehicle of claim 22, wherein the cowl is cylindrically shaped, with the air exit from the cowl facing to the rear of the vehicle with respect to the direction of propelled motion of the vehicle and the cowl having an air entrance facing forwardly of the direction of propelled motion of the vehicle;
the air dam comprising a collar within the cowl, and the collar having a substantially smooth internal diameter from the air entrance of the cowl to the vicinity of the propeller in the cowl, and the cowl then having a greater internal diameter from the propeller to the air exit of the cowl.

24. The vehicle of claim 22, wherein the cowl is cylindrically shaped, with the air exit from the cowl facing to the rear of the vehicle with respect to the direction of propelled motion of the vehicle and the cowl having an air entrance facing forwardly of the direction of propelled motion of the vehicle.

25. The vehicle of claim 24, further comprising a rudder in the vicinity of the cowl in the path of air blown by the propeller for directing the turning motion of the vehicle.

26. The vehicle of claim 22, further comprising a respective lateral exit for air at each side of the cowl and located upstream of the downstream exit, the lateral exits being placed such that air exiting from the cowl at one of the lateral exits blows the vehicle sideways to turn the vehicle; control means in each lateral exit for controlling air flow therethrough for controlling motion of the vehicle.

27. The vehicle of claim 26, wherein the control means comprise louver means operable for closing the respective lateral exit and for opening that lateral exit to air flow therethrough.

28. The vehicle of claim 27, wherein the louver means is selectively operable between a closed position for blocking air flow through the respective lateral exit, a first thrusting position at which air flow past the louver means moves the vehicle sideways for turning it and a second thrusting position at which the louver means directs air flowing therepast generally in the direction of propelled motion of the vehicle, whereby with at least one of the louver means in the second thrusting position, force is applied to the vehicle to move the vehicle contrary to its normal direction of propelled motion.

29. The vehicle of claim 28, further comprising control means for selectively and independently moving each of the louver means between its closed, first and second positions.

30. The vehicle of claim 28, further comprising a shutter over the cowl downstream exit, the shutter being movable between an open position for permitting air flow out the downstream exit and a closed position for blocking air flow through the downstream exit and to positions between the closed and open positions.

31. The vehicle of claim 30, further comprising control means for selectively and independently moving each of the louver means between its closed, first and second positions.

32. The vehicle of claim 30, wherein both louver means are so positioned that with the shutter at least substantially in the closed position, and both of the louver means in their respective second thrusting positions, the vehicle is moved contrary to its normal direction of propelled motion.

33. The vehicle of claim 20, further comprising a canopy covering over and enclosing the upper deck means and extending to and enclosing the cowl entrance and blocking passage of air to the cowl entrance;
openings into the side of the vehicle leading inside the canopy along those sides of the canopy which are not facing in the direction of normal propelled motion of the vehicle, and the openings in the canopy being for inlet of air into the canopy for supplying air to the cowl entrance.

34. The vehicle of claim 30, further comprising a dividing shelf in the cowl placed for dividing the air flow from the propeller so that the part beneath the shelf blows down into the plenum while the part above the shelf blows out the rear of the cowl.

35. The vehicle of claim 34, further comprising outwardly inclined means above the shelf for redirecting air blown above the shelf generally outwardly to blow in a direction toward the louver means as it blows rearwardly out of the cowl.

36. The vehicle of claim 26, further comprising a shutter over the cowl downstream exit, the shutter being movable between an open position for permitting air flow out the downstream exit and a closed position for blocking air flow through the downstream exit and to positions between the closed and open positions.

37. A vehicle which rides on an air cushion and which is propelled by air, comprising:
upper deck means, having a bottom edge which defines the periphery of an area;
a thin, flexible sheet located below the upper deck means, extending beneath the bottom edge and secured beneath the bottom edge for defining a plenum that is defined by and closed off by the upper deck means and the sheet; the deck means being shaped within the area defined by its bottom edge for causing the plenum to always be an open space and the upper deck means being rigid enough to maintain that open condition of the plenum; the sheet being secured in a manner permitting the sheet to pillow when air is pressurized in the plenum;
the sheet being perforated below the upper deck means for permitting exit of air from the plenum at a controllable rate through the perforations;
air pressure generating means; a plenum inlet for communicating air from the generating means into the plenum for pressurizing the plenum, whereby the sheet may pillow and air may escape through the perforations, for both jacking up the upper deck means and for creating an air cushion between the sheet and the surface over which the vehicle moves; and
air propulsion means connected with the vehicle for propelling the vehicle once it is raised on the air cushion;
the air pressure generating means and the air propulsion means comprising a single source of pressurized air mounted on the vehicle and dividing means for dividing the flow of pressurized air, part into the plenum inlet and part external to the plenum for propelling the vehicle; the single source of pressurized air comprising a propeller and means for driving the propeller to blow air into the plenum inlet and also past the vehicle for propelling the vehicle; the plenum inlet comprising a first duct of smaller radius than the propeller, located at the axis of the propeller, for receiving part of the air flow generated by the propeller, and a second duct extending from the first duct and communicating air flow from the propeller into the plenum.

38. The vehicle of claim 37, wherein the first duct is coaxial with the propeller.

39. The vehicle of claim 37, wherein the second duct enters the plenum toward the rear of the vehicle with respect to the direction of propelled motion of the vehicle and the second duct includes an exit in the plenum facing forwardly in the plenum.

40. The vehicle of claim 37, wherein the propeller is attached to the first duct for rotating together with the first duct, while the second duct is non-rotatable with respect to the vehicle.

41. The vehicle of claim 40, wherein the propeller is disposed part way along the length of the duct.

42. The vehicle of claim 41, wherein the first duct is coaxial with the propeller.

* * * * *